(12) United States Patent
Kitada

(10) Patent No.: US 10,691,267 B2
(45) Date of Patent: Jun. 23, 2020

(54) TOUCH INPUT DEVICE

(71) Applicant: Murata Manufacturing Co., Ltd., Nagaokakyo-shi, Kyoto-fu (JP)

(72) Inventor: Hiroaki Kitada, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 61 days.

(21) Appl. No.: 15/683,996

(22) Filed: Aug. 23, 2017

(65) Prior Publication Data

US 2017/0371454 A1    Dec. 28, 2017

Related U.S. Application Data

(63) Continuation of application No. PCT/JP2016/055970, filed on Feb. 29, 2016.

(30) Foreign Application Priority Data

Mar. 4, 2015 (JP) ................. 2015-042118

(51) Int. Cl.
*G06F 3/044* (2006.01)
*G06F 3/041* (2006.01)

(52) U.S. Cl.
CPC ............ *G06F 3/044* (2013.01); *G06F 3/0418* (2013.01); *G06F 2203/04102* (2013.01); *G06F 2203/04105* (2013.01); *G06F 2203/04106* (2013.01)

(58) Field of Classification Search
CPC ................... G06F 3/044; G06F 3/0414; G06F 2203/04103; G06F 2203/04105
See application file for complete search history.

(56) References Cited

U.S. PATENT DOCUMENTS 9,720,533 B2    8/2017   Ando
2006/0227114 A1  10/2006  Geaghan et al.
2012/0026123 A1   2/2012  Grunthaner et al.
(Continued)

FOREIGN PATENT DOCUMENTS

JP    2008-535092 A    8/2008
JP    2012-33172 A     2/2012
(Continued)

OTHER PUBLICATIONS

Written Opinion of the International Searching Authority issued in International Application No. PCT/JP2016/055970, dated May 17, 2016.
(Continued)

*Primary Examiner* — Yuzhen Shen
(74) *Attorney, Agent, or Firm* — Arent Fox LLP

(57) ABSTRACT

A mobile terminal includes an operation surface, a capacitance sensor having a capacitance that changes in response to a touch operation on the operation surface and a touch-operation detection IC that detects the touch operation based on the change in capacitance in the capacitance sensor. When the operation surface is deformed, the touch-operation detection IC obtains a capacitance of the capacitance sensor which has changed due to the deformation of the operation surface, and grasps the change in capacitance of the capacitance sensor, made due to the touch operation, with the obtained capacitance taken as a new reference.

18 Claims, 8 Drawing Sheets

(56) References Cited

U.S. PATENT DOCUMENTS

| | | | |
|---|---|---|---|
| 2013/0141382 A1* | 6/2013 | Simmons | G06F 3/0418 |
| | | | 345/174 |
| 2013/0257787 A1 | 10/2013 | White et al. | |
| 2014/0002407 A1* | 1/2014 | Badaye | G06F 3/0416 |
| | | | 345/174 |
| 2014/0320447 A1* | 10/2014 | Kung | G06F 3/044 |
| | | | 345/174 |
| 2014/0347304 A1 | 11/2014 | Ando | |
| 2015/0302810 A1* | 10/2015 | Yumoto | G06F 3/044 |
| | | | 345/206 |
| 2016/0320899 A1* | 11/2016 | Watazu | G06F 3/047 |

FOREIGN PATENT DOCUMENTS

| | | |
|---|---|---|
| JP | 2013-161357 A | 8/2013 |
| WO | WO 2013/122070 A1 | 8/2013 |

OTHER PUBLICATIONS

International Search Report issued in International Application No. PCT/JP2016/055970, dated May 17, 2016.

* cited by examiner

TOUCH INPUT DEVICE

CROSS REFERENCE TO RELATED APPLICATIONS

The present application is a continuation of International application No. PCT/JP2016/055970, filed Feb. 29, 2016, which claims priority to Japanese Patent Application No. 2015-042118, filed Mar. 4, 2015, the entire contents of each of which are incorporated herein by reference.

TECHNICAL FIELD

The present invention relates to a touch input device which detects a touch operation of a user.

BACKGROUND ART

In order to detect a touch operation on an operation surface such as a display, a variety of touch input devices, each provided with a capacitance sensor, have hitherto been devised. The capacitance sensor is typically made up of a dielectric film disposed in the vicinity of the operation surface and a plurality of electrodes formed on the surface of the dielectric film. In the capacitance sensor, a touch operation is performed on the operation surface to bring a change in electrical field in the vicinity of the operation surface, and thereby bring a change in electrostatic capacitance between the electrodes. Thus, in touch-operation detection processing, a capacitance of the capacitance sensor has regularly been detected as a reference value (hereinafter referred to as a reference capacitance), and a touch operation has been detected based on a variation of an electrostatic capacitance detected from the capacitance sensor (hereinafter referred to as a detected capacitance) from the reference value.

Further, in some cases, the conventional touch input devices have been made up of a deformation sensor in order to detect an operation to deform the operation surface (hereinafter referred to as a deformation operation), such as bending, twisting, and pushing of the operation surface, in addition to the touch operation (e.g., see WO2013/122070).

SUMMARY OF THE INVENTION

In a case where deformation occurs on the operation surface in the conventional touch input device, when the dielectric film of the capacitance sensor is deformed by deformation of the operation surface, a change also occurs in distance between the electrodes in the capacitance sensor. For this reason, when deformation such as bending or twisting of the operation surface is too large, the detected capacitance of the capacitance sensor significantly changes and this may be erroneously detected as a touch operation having been performed even though the touch operation has not been performed.

Accordingly, it is an object of the present invention to provide a touch input device capable of detecting a touch operation more accurately than in the past, even where the operation surface has been significantly deformed.

BRIEF DESCRIPTION OF THE INVENTION

The invention includes a touch input device comprising an operation surface, a capacitance sensor having a capacitance that changes in response to a touch operation on the operation surface, and a circuit for determining whether the touch operation has taken place based on the change in capacitance of the capacitance sensor. The circuit periodically reads a detected value of the capacitance, compares the detected value to a stored reference value, and updates the stored reference value with a most recently read detected value at the earlier of the lapse of a predetermined time period and the occurrence of a predetermined deformation of the operation surface.

With this configuration, even when a change occurs in detected capacitance due, for example, to an influence by static electricity, the touch operation is detected based on the changed detected capacitance, and it is thereby possible to prevent erroneous generation of an operation signal of the touch operation from the change in detected capacitance of the capacitance sensor due to static electricity or the like.

Also in this embodiment, where deformation has occurred on the operation surface, a change in capacitance made by a touch operation is recognized by taking as a new reference a capacitance having changed due to the deformation and it is thereby possible to prevent erroneous generation of an operation signal of the touch operation.

With this configuration, even when deformation occurs on the operation surface and a capacitance of the capacitance sensor changes, it is possible to prevent erroneous generation of an operation signal of the touch operation.

The capacitance sensor preferably has a plurality of capacitors each corresponding to a respective location on the operation surface and the circuit determines, for each respective location, whether a touch operation has taken place based on the change in capacitance of the capacitance sensor corresponding to that location. The circuit, for at least a plurality of the locations, periodically reads a detected value of the capacitance for the corresponding location, compares the detected value to a stored reference value for the corresponding location, and updates the stored reference value for the corresponding location with a most recently read detected value for the corresponding location at the earlier of the lapse of a predetermined time period and the occurrence of a predetermined deformation of the operation surface. Preferably, the circuit performs this function for each of the locations.

In an embodiment, the circuit determines, for at least a plurality of the locations, that a touch operation has taken place when the change in capacitance of the capacitor corresponding to the respective location is greater than a predetermined value and determines a touch area as a function of which of the locations was subject to a touch operation. With this configuration, not all capacitances but only some capacitance is selected and obtained as a new reference, thereby enabling reduction in calculation cost and processing time required for this processing. Even when not all capacitances but only some capacitance is to be obtained as a new reference, a region with large deformation of the operation surface can be reliably selected.

In a preferred embodiment, the stored reference values for the corresponding locations are updated in response to the occurrence of the predetermined deformation of the operation surface only when the touch area is greater than a predetermined value. With this configuration, not all capacitances but only some capacitance is selected and obtained, thereby enabling reduction in calculation cost and processing time required for this processing. With this configuration, by using the fact that a capacitance change occurs in a wide region on the operation surface when deformation such as bending or twisting is added to the operation surface, a wide region on the operation surface, in which deformation has occurred, can be reliably selected.

In an embodiment, the circuit determines a touch position to be the position within the touch area corresponding to the capacitor with the largest change in capacitance value. In another embodiment, the circuit determines a touch position to be the position within the touch area corresponding to the center of the touch area.

The capacitance sensor preferably includes a dielectric part that is deformed integrally with the operation surface, and a plurality of detection electrodes, respective pairs of the detection electrodes defining respective ones of the plurality of capacitors. With this configuration, the touch input device accepts the deformation operation as well as the touch operation, thereby enabling provision of a variety of operation methods to the user. Furthermore, the deformation sensor that is used for detecting deformation of the operation surface in the touch-operation detection part detects the deformation operation, thereby enabling sharing and simplification of the configuration.

The circuit is preferably associated with a reset switch or other structure which updates at least some of the stored reference values in response to a user input other than a touch operation and a deformation of the operation surface. With this arrangement, circuit may obtain, as a new reference, a capacitance of the capacitance sensor which has changed due to the deformation of the operation surface. Examples of the user input includes a predetermined touch operation on a region in which deformation of the operation surface has not occurred, and a predetermined push-in operation of a mechanical switch provided separately from the operation surface.

The invention is also directed towards a method for determining whether a touch operation has been performed on an operation surface associated with a capacitance sensor having a capacitance that changes in response to a touch operation on the operation surface. The method comprises periodically reading a detected value of the capacitance, comparing the detected value to a stored reference value, and updating the stored reference value with a most recently read detected value at the earlier of the lapse of a predetermined time period and the occurrence of a predetermined deformation of the operation surface.

The capacitance sensor preferably has a plurality of capacitors each corresponding to a respective location on the operation surface and the circuit determines, for each respective location, whether a touch operation has taken place based on the change in capacitance of the capacitance sensor corresponding to that location. The method, for at least a plurality of the locations, periodically reads a detected value of the capacitance for the corresponding location, compares the detected value to a stored reference value for the corresponding location, and updates the stored reference value for the corresponding location with a most recently read detected value for the corresponding location at the earlier of the lapse of a predetermined time period and the occurrence of a predetermined deformation of the operation surface. Preferably, the method performs this function for each of the locations.

In an embodiment, the method determines, for at least a plurality of the locations, that a touch operation has taken place when the change in capacitance of the capacitor corresponding to the respective location is greater than a predetermined value and determines a touch area as a function of which of the locations was subject to a touch operation. In a preferred embodiment, the stored reference values for the corresponding locations are updated in response to the occurrence of the predetermined deformation of the operation surface only when the touch area is greater than a predetermined value.

In an embodiment, the method determines a touch position to be the position within the touch area corresponding to the capacitor with the largest change in capacitance value. In another embodiment, the method determines a touch position to be the position within the touch area corresponding to the center of the touch area.

DESCRIPTION OF THE PREFERRED EMBODIMENTS

Hereinafter, a plurality of embodiments will be described by taking as an example the case of constituting a mobile terminal as a touch input device of the present invention.

Figure 1:
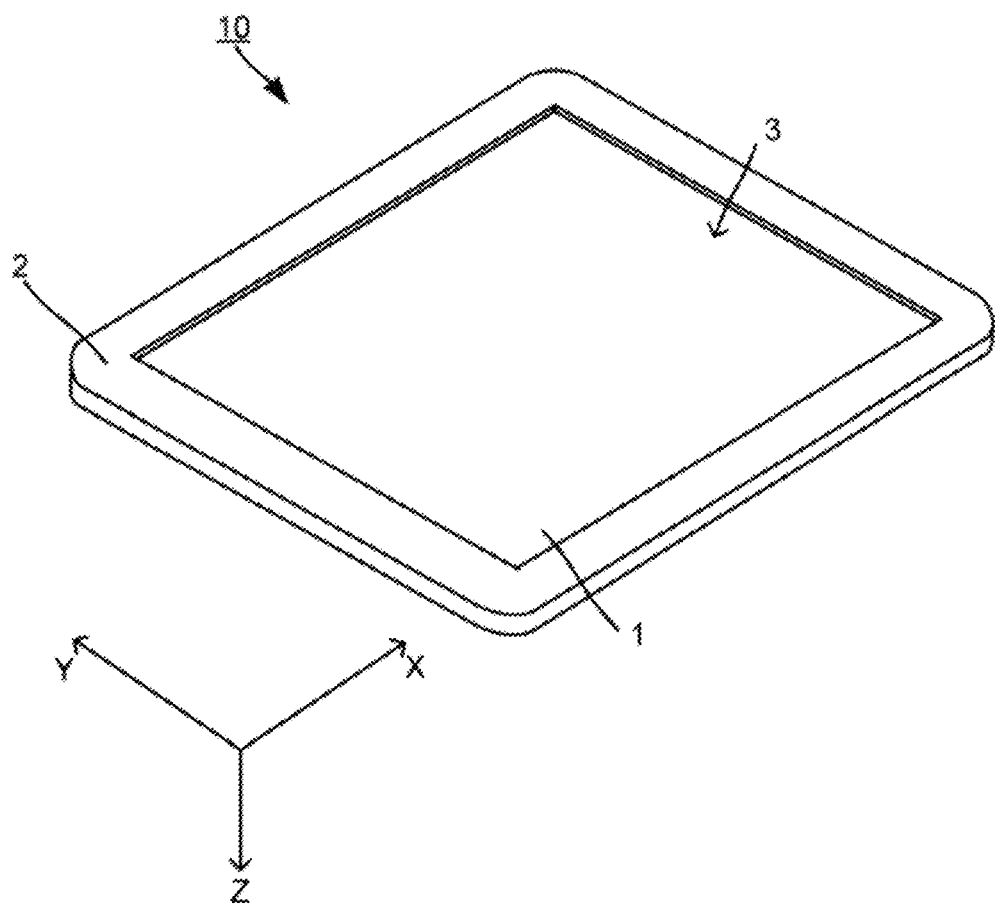
FIG. 1 is a perspective view of a mobile terminal according to a first embodiment of the present invention.

FIG. 1 is a perspective view of a mobile terminal 10 according to a first embodiment of the present invention. The mobile terminal 10 preferably has a flat rectangular parallelepiped shape and a size large enough to allow the user to hold opposite ends of the longitudinal direction and the lateral direction. More particularly it has a length in the x-axis direction, a width in the y-axis direction and a depth in the z-axis direction. An operation surface 3 accepts a touch operation with a finger or the like and a deformation operation which deforms the operation surface 3. The deformation operation is, for example, any of an operation of the user to hold opposite ends of the longitudinal direction or the lateral direction of the mobile terminal 10 and warping the operation surface 3 thicknesswise, an operation of the user to twist the operation surface 3 around an axis along the longitudinal direction or the lateral direction, and an operation of the user to partially push inward the operation surface 3 thicknesswise with his or her finger.

The mobile terminal 10 preferably includes a touch panel 1 and a housing 2. The housing 2 is preferably in the shape of a box provided with an opening on one main surface. The touch panel 1 is fit within the opening and its exposed surface preferably functions as a display surface that displays the operation surface 3 and an image.

Figure 2:
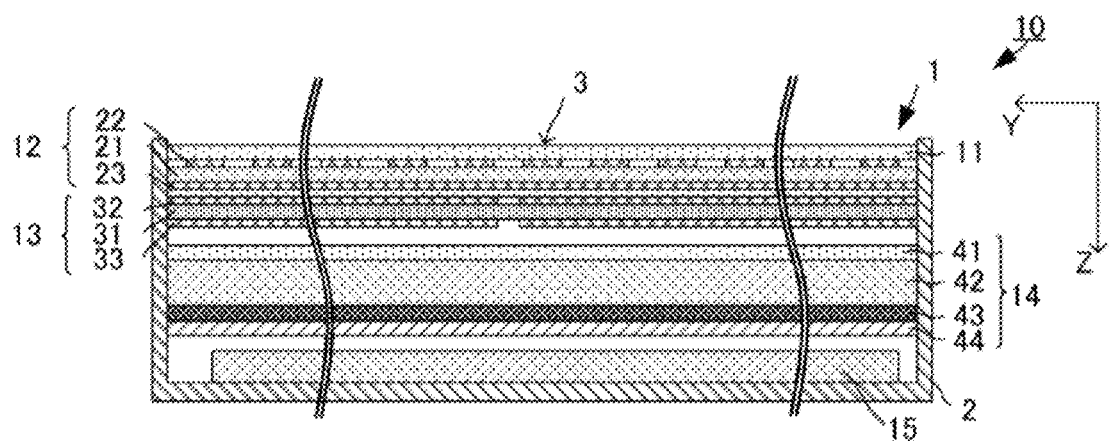
FIG. 2 is a sectional view of the mobile terminal according to the first embodiment of the present invention.

FIG. 2 is a sectional view of the mobile terminal 10, showing a cross section of the mobile terminal 10 seen in the X-axis direction. As shown therein, touch panel 1 includes an operation plate 11, a capacitance sensor 12, a deformation sensor 13, a display part 14, a circuit board 15, a touch-operation detection IC 16 (cf. FIG. 3), and a deformation-operation detection IC 17 (cf. FIG. 4). The operation plate 11, the capacitance sensor 12, the deformation sensor 13, the display part 14, and the circuit board 15 are each preferably in a tabular shape and disposed parallel to a bottom plate of the housing 2 inside the housing 2.

Further, the operation plate 11, the capacitance sensor 12, the deformation sensor 13, the display part 14, and the circuit board 15 are arrayed in this order from the operation surface 3 side to the bottom plate side of the housing 2.

In the embodiment, the surface of the operation plate 11 functions as both the operation surface 3 and the display surface. The operation plate 11 is preferably made of a translucent insulating material. The operation plate 11 is preferably provided for protecting the capacitance sensor 12 from contact with the outside, but is not required.

The capacitance sensor 12 is configured so as to have a capacitance that changes due to a touch operation on the operation surface 3. Like the operation plate 11, the capacitance sensor 12 is preferably made of a translucent material. Further, the capacitance sensor 12 is preferably adhered to the bottom surface of the operation plate 11 so as to deform integrally with the operation surface 3. When the operation plate 11 is not provided, the capacitance sensor 12 is configured so as to be exposed on the operation surface 3 of the mobile terminal 10.

The touch-operation detection IC 16 (FIG. 3) functions as a touch-operation detection unit to detect a change in capacitance in the capacitance sensor 12 and generate an operation signal due to the touch operation performed on the operation surface 3. The touch-operation detection IC 16 also preferably functions as a reference holding part (a memory) to store a capacitance value as a reference value (a reference capacitance) that is used at the time of determining the change in capacitance in the capacitance sensor 12. The touch-operation detection IC 16 also preferably functions as an update control unit which updates the reference capacitance based on a capacitance of the capacitance sensor 12 at the time a deformation occurs. The touch-operation detection IC 16 is preferably attached either to part of the capacitance sensor 12 which is not shown or to the circuit board 15. The touch-operation detection IC can include a programmed CPU and/or other logic circuits to perform the functions described in further detail below.

The deformation sensor 13 is configured so as to produce an output in response to a deformation operation on the operation surface 3. The deformation sensor 13 is preferably made of a translucent material and is adhered to the bottom surface of the capacitance sensor 12 using a translucent pressure-sensitive adhesive or the like so as to be deformed integrally with the operation surface 3.

The deformation-operation detection IC 17 (FIG. 4) obtains a detected voltage from the output of the deformation sensor 13 and generates a deformation operation signal indicative of the deformation operation on the operation surface 3. The deformation-operation detection IC 17 is preferably attached to either part of the deformation sensor 13 which is not shown or to the circuit board 15. Like the touch-operation detection IC 16, the deformation operation detection IC 17 can include a programmed CPU and/or other logic circuits to perform the functions described in further details below.

The display part 14 is configured so as to display an image, with the operation surface 3 taken as the display surface. Further, the display part 14 is preferably disposed on the bottom surface side of the deformation sensor 13. The display part 14 is preferably disposed on the bottom surface side of the deformation sensor 13 via a gap as shown in FIG. 2. The display part 14 may be adhered to the bottom surface of the deformation sensor 13, or the display part 14 may be omitted. When the display part 14 is not provided, each member which is disposed closer to the operation surface 3 side than the display part 14 can be made of a non-translucent material.

The display part 14 may be a liquid crystal display. Note that the display part 14 can be formed to have another configuration, such as electronic paper. The display part 14 preferably includes a top surface polarizing plate 41, a liquid crystal panel 42, a back surface polarizing plate 43, and a backlight 44. The top surface polarizing plate 41, the liquid crystal panel 42, the back surface polarizing plate 43, and the a backlight 44 are preferably disposed within the housing 2 and are each preferably in a tabular shape and disposed parallel to the bottom plate of the housing 2. Further, the top surface polarizing plate 41, the liquid crystal panel 42, the back surface polarizing plate 43, and the backlight 44 are preferably arrayed in this order from the operation surface 3 side to the bottom plate side of the housing 2.

Light emitted by the backlight 44 is preferably polarized when passing through the back surface polarizing plate 43. The amount of the light having passed through the back surface polarizing plate 43 is preferably controlled for each a plurality of pixels in the liquid crystal panel 42. The light having passed through the liquid crystal panel 42 is further polarized when passing through the top surface polarizing plate 41. The deformation sensor 13, the capacitance sensor 12, and the operation plate 11, which are each made of a translucent material, are preferably laminated on the surface of the display part 14, and hence the display part 14 displays an image with the operation surface 3 operating as the display surface.

The circuit board 15 is preferably a mother board on which a CPU and a memory are provided, and is connected with the foregoing touch-operation detection IC 16, deformation-operation detection IC 17, and display part 14 via connectors or the like (these IC's can also be housed on the mother board). Further, the circuit board 15 is preferably disposed on the bottom surface side of the display part 14. Note that the circuit board 15 may be adhered to the bottom surface of the display part 14.

Circuit board 15 (and with it the IC's 16 and 17) has a function as a so-called operating system that performs display control, network control, application control, input control, and the like of the mobile terminal 10. The input control includes processing the operation signal of the touch operation which is inputted from the capacitance sensor 12, and processing the operation signal of the deformation operation which is inputted from the deformation sensor 13. Further, the circuit board 15 is preferably configured to have part of the function of the update control unit, which the touch-operation detection IC 16 has. Specifically, the circuit board 15 is preferably configured so as to generate, upon receipt of the deformation-operation signal from the deformation-operation detection IC 17, a deformation timing notification signal which is sent to the touch-operation detection IC 16 (more particularly, to the Update Control Unit 53).

Figure 3:
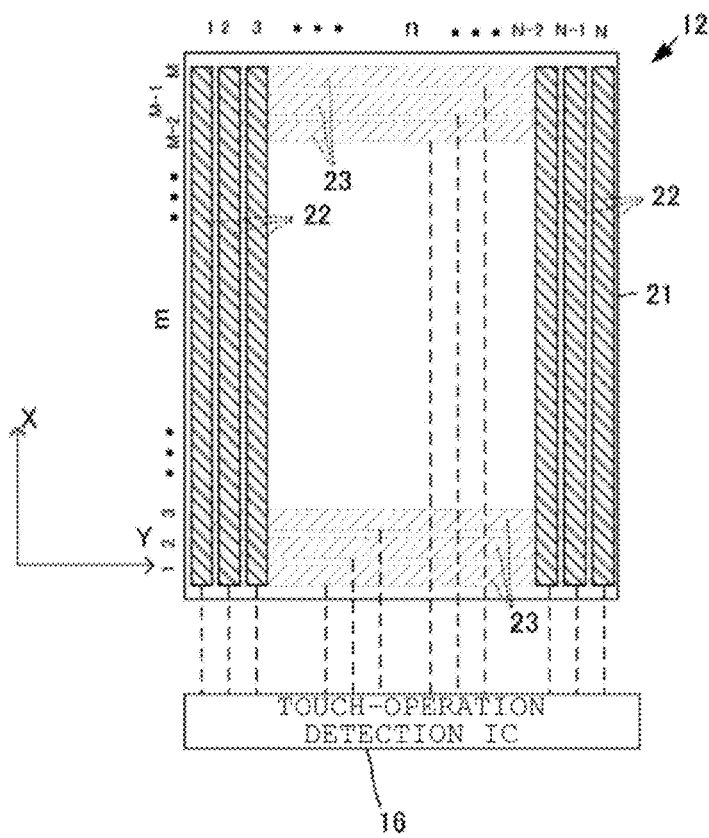
FIG. 3 is a plan view of a capacitance sensor according to the first embodiment of the present invention.

FIG. 3 is a plan view of the capacitance sensor 12. The capacitance sensor 12 preferably includes a dielectric film 21 and a plurality of detection electrodes 22, 23. The detection electrodes 22 are preferably provided on one main surface side (preferably the operation surface 3 side) of the dielectric film 21. The detection electrodes 23 are preferably provided on the other main surface side (preferably the bottom plate side of the housing 2) of the dielectric film 21. Each detection electrode 22 and each detection electrode 23 are preferably connected to the touch-operation detection IC 16.

The dielectric film 21 and the detection electrodes 22, 23 are preferably made of a translucent material. For example, the dielectric film 21 can be made of PMMA (acrylic resin) or the like. The detection electrodes 22, 23 can, for example, be made of indium tin oxide (ITO) or the like. Note that the detection electrodes 22, 23 can be configured so as to be made of a different translucent electrode material, such as zinc oxide (ZnO) or a conductive polymer such as polythiophene.

The plurality of detection electrodes 22, 23 are each preferably rectangular shape being longer in one direction in plan view. The N detection electrodes 22 are preferably arranged so as to be longitudinally parallel to one another in the X-axis direction and be arrayed at predetermined intervals along the Y-axis direction. The M detection electrodes 23 are preferably arranged so as to be longitudinally parallel to one another in the Y-axis direction and be arrayed at predetermined intervals along the X-axis direction. Hence the plurality of detection electrodes 22 and the plurality of detection electrodes 23 intersect in a two-dimensional rectangular pattern in plan view and face each other in N×M locations. As a result, a respective capacitor is formed at each position where a detection electrode 22 overlaps a detection electrode 23. Each such capacitor generates an electrical field in the vicinity of the position at which the n-th detection electrode 22 and the m-th detection electrode 23 intersect on the operation surface 3. This electrical field is influenced by a touch operation to cause the capacitance of each capacitor to change as a function of the touch operation.

As described below with reference to the flow chart of FIG. 6, the touch-operation detection IC 16 applies a drive signal to each of the detection electrodes 22 and each of the detection electrodes 23 sequentially such that at any given instant of time a single detection electrode 22 and a single detection electrode 23 receives a drive signal and the capacitance of the capacitor at the location where those two electrodes cross is read as a detected capacitance. The touch-operation detection IC 16 compares the read detected capacitance with a stored reference value (indicating a previously detected capacitance value of the same detection electrode combination, i.e., of the same capacitor) and determines the difference between the presently detected reference values (reference capacitance) to determine if the detected capacitance has changed. The touch-operation detection IC 16 determines this change for each detection electrode pair (i.e., for each capacitor) and then detects the position of the touch operation based thereon.

In the following description, the detected capacitance Cs(n, m) is detected capacitance of the capacitor (n, m) (i.e., the capacitor formed at the location where the n-th detection electrode 22 and the m-th detection electrode 23 cross), the reference capacitance corresponding to the previously detected capacitance Cs(n, m) is referred to as to a reference capacitance Cb(n, m), and a position of a touch operation that has an influence on the detected capacitance Cs(n, m) is referred to as a position P(n, m).

Figure 4:
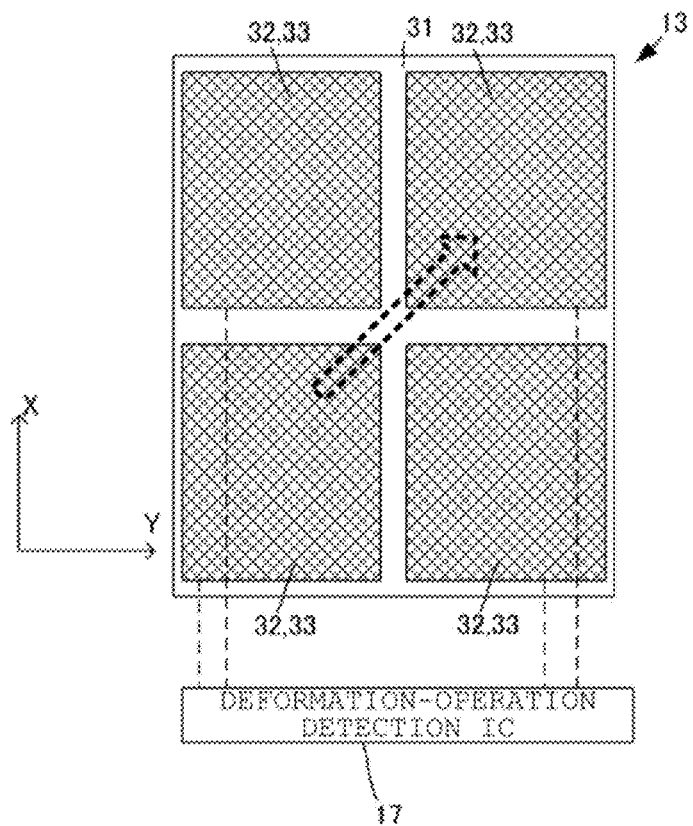
FIG. 4 is a plan view of a deformation sensor according to the first embodiment of the present invention.

FIG. 4 is a plan view of the deformation sensor 13. The deformation sensor 13 includes a piezoelectric film 31 and a plurality of detection electrodes 32, 33. The plurality of detection electrodes 32 are preferably formed on one main surface (the operation surface 3 side) of the piezoelectric film 31. The plurality of detection electrodes 33 are preferably formed on the other main surface (the bottom plate side of the housing 2) of the piezoelectric film 31. The detection electrode 32 and the detection electrode 33 are formed so as to face each other in each region formed by dividing the main surface of the piezoelectric film 31 into several parts (e.g., four parts in the drawing shown). Each group of the detection electrode 32 and the detection electrode 33 are connected to the deformation-operation detection IC 17.

The detection electrodes 32, 33 are preferably made of a translucent material. For example, the detection electrodes 32, 33 can be made of indium tin oxide (ITO) or the like. Note that the detection electrodes 32, 33 can be configured so as to be made of another translucent electrode material such as zinc oxide (ZnO) or a conductive polymer such as polythiophene.

Further, the piezoelectric film 31 is made of a translucent piezoelectric material. The piezoelectric film 31 is more preferably a piezoelectric material having piezoelectricity, with which a charge is generated on the top and bottom surfaces as a result of stretch or shrinkage in an in-plane direction, such as L-polylactic acid (PLLA) or D-polylactic acid (PDLA), which is a chiral polymer material subjected to stretching processing. The chiral polymer has a main chain in a helical structure, and has piezoelectricity by stretching of the chiral polymer and orientation of molecules. The chiral polymer produces the piezoelectricity in a molecule orienting processing by stretching or the like, and does not need to be subjected to poling processing unlike other polymers such as PVDF or a piezoelectric ceramics. Especially, since polylactic acid has no pyroelectricity, even when the deformation sensor is disposed in a position close to the operation surface and the heat of the finger of the user or the like is transmitted, the amount of the detected charge remains unchanged.

Further, a piezoelectric constant of the uniaxially stretched PLLA is very high among polymers. Moreover, the piezoelectric constant of PLLA does not fluctuate over time, but is very stable.

In the deformation sensor 13, the above piezoelectric film 31 is preferably disposed such that the extending direction is a direction (a direction shown by a dotted arrow in FIG. 4) that forms an angle of substantially 45° with respect to the X-axis direction or the Y-axis direction.

In the deformation sensor 13 as thus configured, when the piezoelectric film 31 shrinks in the X-axis or Y-axis directions or is warped in the Z-axis direction, a charge is generated on the surface of the piezoelectric film 31 by a charge amount in accordance with the degree of deformation. Accordingly, each group of the detection electrodes 32, 33 has a potential difference in accordance with a total amount of the charge generated in the region of the piezoelectric film 31 provided with each group.

The deformation-operation detection IC 17, a specific control flow of which will be described later, reads a potential difference as a detected voltage in each group of the detection electrodes 32, 33. Based on those detected voltages, the deformation-operation detection IC 17 generates an operation signal indicating the performance or non-performance of the deformation operation with respect to each type of deformation operation.

In this context, as the type of the deformation operation, the deformation-operation detection IC 17 detects a deformation operation which warps the main surface of the piezoelectric film 31, for example, a deformation which twists the main surface of the piezoelectric film 31, a deformation operation which pushes inwardly any one of the four-divided regions on the main surface of the piezoelectric film 31, or another deformation operation. When a deformation operation which warps the main surface of the piezoelectric film 31 is performed, detected voltages corresponding to two adjacent regions change to the same degree. When the deformation operation twists the main surface of the piezoelectric film 31, detected voltages corresponding to two diagonally located regions change with polarities opposite to each other. When the deformation operation inwardly pushes any one of the four-divided regions on the main surface of the piezoelectric film 31, only a detected voltage corresponding to that region changes in a large degree.

Hence the deformation-operation detection IC 17 can detect the type of the deformation operation from the combination pattern of changes in a plurality of detected voltages. Note that the deformation-operation detection IC 17 may simply be capable of detecting one of the above deformation operations and the deformation sensor 13 may be provided while the detection electrodes 32, 33 are not divided, for example.

Figure 5:
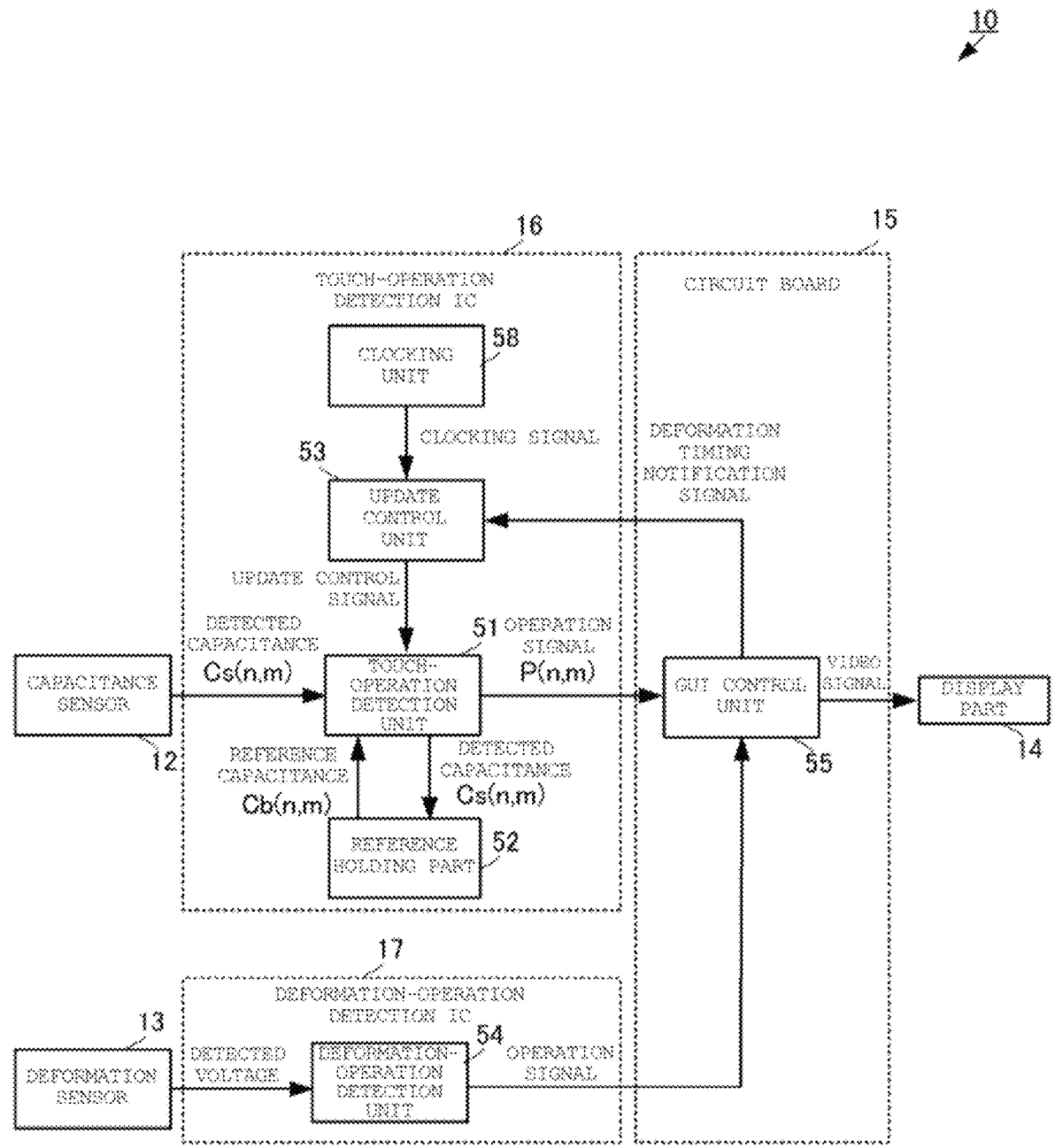
FIG. 5 is a function block diagram of the mobile terminal according to the first embodiment of the present invention.

FIG. 5 is a function block diagram of the mobile terminal 10. The touch-operation detection IC 16 includes as function blocks a touch-operation detection unit 51, a reference holding (storage) unit 52, an update control unit 53, and a clocking unit 58 (e.g., a digital clock). The deformation-operation detection IC 17 includes a deformation-operation detection unit 54 as a function block. The circuit board 15 includes a GUI (graphical user interface) control unit 55 as a function block.

The touch-operation detection unit 51 reads both the foregoing plurality of detected capacitances Cs(n, m) sequentially from the capacitance sensor 12 and the plurality of reference capacitances Cb(n, m) held by the reference holding (storage) unit 52. Based on the obtained plurality of detected capacitances Cs(n, m) and plurality of reference capacitances Cb(n, m), the touch-operation detection unit 51 specifies the position P(n, m) at which the touch operation has been performed, and outputs an operation signal concerning the specified position P(n, m) to the GUI control unit 55. Further, the touch-operation detection unit 51 receives an update control signal output by the update control unit 53. In response to the receipt of the update control signal, the touch-operation detection unit 51 updates the reference capacitance Cb(n, m) stored in the reference holding unit 52 based on the newly read detected capacitance Cs(n, m).

While the reference holding unit 52 stores the reference capacitance Cb(n, m) read by the touch-operation detection unit 51, the touch-operation detection unit 51 updates the reference capacitance Cb(n, m).

The deformation-operation detection unit 54 reads the foregoing plurality of detected voltages from the deformation sensor 13. Based on the obtained plurality of detected voltages, the deformation-operation detection unit 54 specifies the type of the deformation operation, and outputs to the GUI control unit 55 an operation signal concerning the performance or non-performance of the deformation operation with respect to each type of deformation operation.

The GUI control unit 55 receives both the touch operation signal output by the touch-operation detection IC 16 and the deformation-operation signal output by the deformation-operation detection IC 17 and then performs standard input processing based on the operation signals to control a GUI environment. Moreover, the GUI control unit 55 outputs a display signal based on the GUI environment to the display part 14. In response to its receipt of the deformation operation signal outputted from the deformation-operation detection IC 17, the GUI control unit 55 outputs a deformation timing notification signal to the update control unit 53. The clocking unit 58 also outputs a clocking signal to the update control unit 53.

The update control unit 53 receives both the deformation timing notification signal output by GUI control unit 55 and the clocking signal from the clocking unit 58. The update control unit 53 specifies a fixed time interval based on the clocking signal received from the clocking unit 58 and outputs an update control signal to the touch-operation detection unit 51 at each such timing. Further, when the deformation timing notification signal output by the circuit board 15 is received, the update control unit 53 also outputs an update control signal to the touch-operation detection unit 51 as described above.

Figure 6:
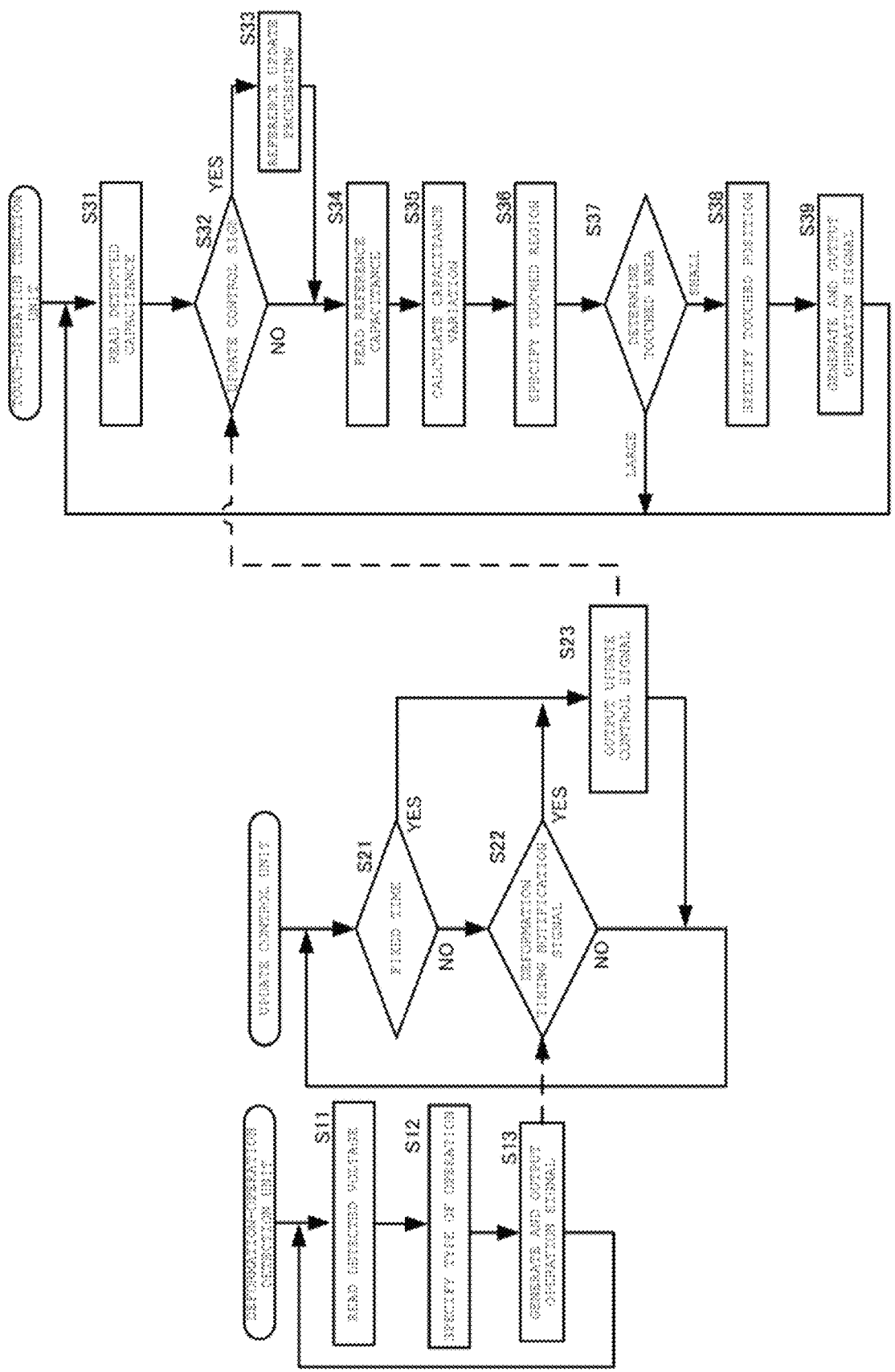
FIG. 6 is a flow diagram showing a control flow in the mobile terminal according to the first embodiment of the present invention.

FIG. 6 is a flow diagram showing specific examples of a control flow of each of the deformation operation detection unit 51, the update control unit 53 and the touch operation detection unit 54. The deformation-operation detection unit 54 repeats the following processing at fixed time intervals. First, the deformation-operation detection unit 54 reads the plurality of detected voltages sequentially output from the deformation sensor 13 and stores these voltages in a memory (not shown) which is connected to (or part of) the deformation-operation detection IC 17 (S11). Next, based on the plurality of read detected voltages, the deformation-operation detection unit 54 specifies the type of the deformation operation that has taken place (S12). Subsequently, the deformation-operation detection unit 54 generates an operation signal indicating the performance or non-performance of the deformation operation with respect to each type of deformation operation, and outputs the generated signal to the GUI control unit 55 (S13).

By this control flow in the deformation-operation detection unit 54, an operation signal concerning the performance or non-performance of the deformation operation with respect to each type of deformation operation is inputted into the GUI control unit 55. The GUI control unit 55 determines the deformation of the operation surface 3 from the operation signal received from the deformation-operation detection unit 54 and outputs the deformation timing notification signal to the update control unit 53 each time the deformation occurs. The update control unit 53 goes on clocking based on the clocking signal output by the clocking unit 58 and determines whether a fixed time has elapsed (S21). If it has not, the update control unit 53 determines whether or not the deformation timing notification signal output by the GUI control unit 55 has been received (S22).

Once the fixed time has elapsed, or the deformation timing notification signal has been received, the update control unit 53 outputs an update control signal to the touch-operation detection unit 51. In this manner, the stored reference capacitances Cb(n, m) are updated at least every fixed time interval set by clocking unit 58 and whenever a deformation operation takes place.

Figure 7:
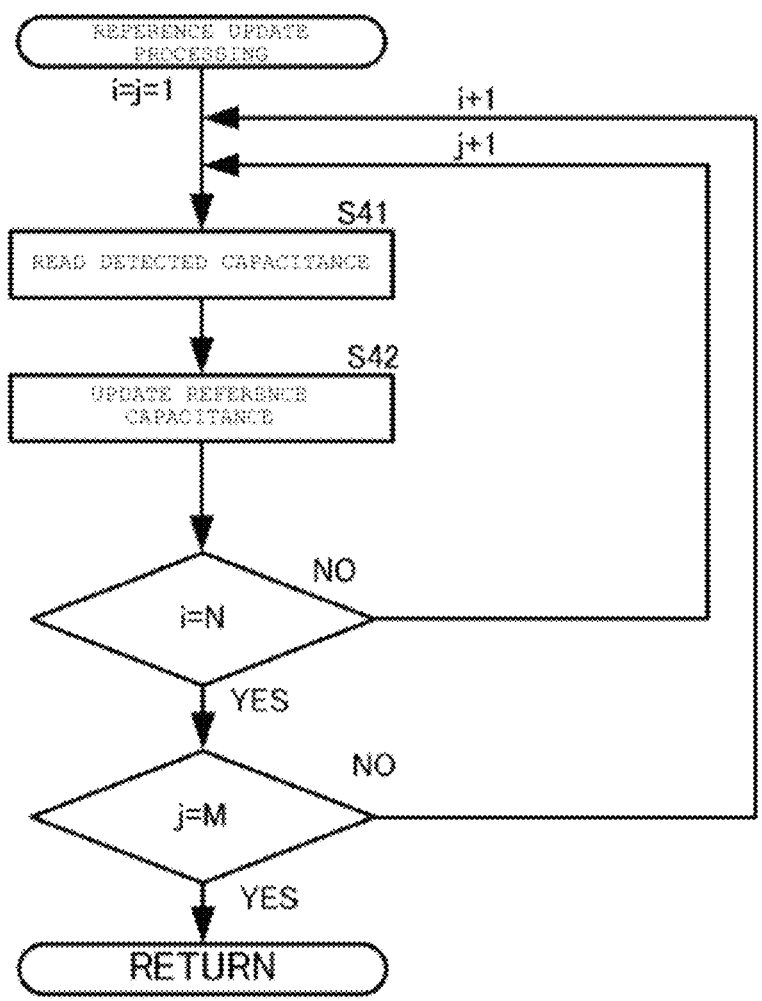
FIG. 7 is a flow diagram showing a control flow of reference update processing in the mobile terminal according to the first embodiment of the present invention.

The touch-operation detection unit 51 repeats the following processing at the fixed time intervals. First, the touch-operation detection unit 51 reads the foregoing plurality of detected capacitances Cs(n, m) sequentially from the capacitance sensor 12, and stores the read capacitances into a memory (not shown) which is connected to (or part of) the touch-operation detection IC 16 (S31). Next, the touch-operation detection unit 51 determines whether the update control signal is received from the update control unit 53 (S32). When the update control signal is received from the update control unit 53, the touch-operation detection unit 51 performs reference update processing (S33). FIG. 7 is a diagram showing a control flow of the reference update processing in the present embodiment.

In the present embodiment, the touch-operation detection unit 51 executes the following processing for each position Pb(n, m). First, the touch-operation detection unit 51 reads the detected capacitance Cs(n, m) from the memory (S41), and writes the read detected capacitance Cs(n, m) into the memory as a new reference capacitance Cb(n, m) (S42). The above processing is executed for each position Pb(n, m) and updates all the reference capacitances Cb(n, m). Note that the reference capacitance Cb(n, m) may be stored into the memory as digital data of a capacitance value so as to be stored in the reference holding unit 52. However, the reference capacitance Cb(n, m) may be stored in the reference holding unit 52 by other methods. For example, the reference capacitance Cb(n, m) may be stored by storing other digital data convertible to a capacitance value, or by being held as a state value of a capacitance element or the like.

Referring again to FIG. 6, the touch-operation detection unit 51 reads the reference capacitance Cb(n, m) stored in the reference holding unit 52 for each position P(n, m) (S34). Next, the touch-operation detection unit 51 calculates a difference between the reference capacitance Cb(n, m) and the detected capacitance Cs(n, m) read at each position P(n, m), namely a capacitance variation $\Delta C(n, m)$ of the detected capacitance Cs(n, m) from the previous update time of the reference capacitance Cb(n, m) (S35).

Next, the touch-operation detection unit 51 determines the performance or non-performance of the touch operation at each position P(n, m) and specifies a region subjected to the touch operation (a touched region) and a region not subjected to the touch operation (an untouched region) (S36). For example, at each position P(n, m), the touch-operation detection IC 16 compares the corresponding capacitance variation $\Delta C(n, m)$ with a threshold As. When the capacitance variation $\Delta C(n, m)$ exceeds the threshold As, the touch-operation detection IC 16 regards the corresponding position as being included in the region subjected to the touch operation (the touched region). When the capacitance variation $\Delta C(n, m)$ does not exceed the threshold As, the touch-operation detection IC 16 regards the position being included in the region not subjected to the touch operation (the untouched region). Then, the touch-operation detection IC 16 stores, into the memory, mapping data that enables discrimination of the touched region and the untouched region.

Subsequently, the touch-operation detection unit 51 determines whether or not the performed touch operation touched a wide region of the operation surface (for example a touch operation with the user's palm or the like) (S37). For example, the touch-operation detection IC 16 calculates an area (a touched area) S of the touched region and determines whether or not the touched area S exceeds a threshold area Ss. When the touch operation touches the operation surface 3 in a wide region (i.e., when the area S exceeds the threshold area Ss), the generation of an operation signal based on the touched region is made invalid (i.e., is ignored). On the other hand, when the touch operation touches the operation surface 3 a small region palm (i.e., when the area S does not exceed the threshold area Ss), generation of an operation signal based on the touched region is made valid.

The touch-operation detection unit 51 then specifies a touched position within the touched region (S38). Specifically, the touch-operation detection unit 51 either extracts a position P(n, m) corresponding to the center of the touched region or extracts a position P(n, m) at which the capacitance variation $\Delta C(n, m)$ is the largest within the touched region, and specifies the extracted position P(n, m) as the touched position. Other locations can alternatively be specified. The touch-operation detection unit 51 then generates an operation signal including coordinate data of the previously extracted position P(n, m) and the like, and outputs the generated signal to the GUI control unit 55 (S39).

By the control flows described above, the operation signal concerning the position P(n, m) at which the touch operation has been performed and the operation signal concerning the deformation operation are inputted into the GUI control unit 55. Accordingly, in this mobile terminal 10, diversified operation methods can be provided to the user. Further in this mobile terminal 10, when the deformation operation is performed on the operation surface 3, or at the timing when the fixed time elapses, the reference capacitance Cb(n, m) is updated based on the detected capacitance Cs(n, m) detected by the touch-operation detection unit 51. Thus, even when deformation occurs on the operation surface 3 and the detected capacitance Cs(n, m) of the capacitance sensor 12 changes, the touch-operation detection unit 51 can prevent erroneous generation of an operation signal of the touch operation. Further, even when the detected capacitance Cs(n, m) of the capacitance sensor 12 changes due to accumulation of static electricity on the operation surface 3, the reference capacitance Cb(n, m) is updated at fixed time intervals, whereby, just as described above, the touch-operation detection unit 51 can prevent erroneous generation of an operation signal of the touch operation. Accordingly, even when deformation occurs on the operation surface 3 or the touch operation is performed on the operation surface 3 while static electricity is accumulated on the operation surface 3, it is possible to determine a change in detected capacitance Cs(n, m), made due to the touch operation by using the updated reference capacitance Cb(n, m).

In the mobile terminal 10, therefore, the touch operation can be detected more accurately than in the past. Since a deformation output of the deformation sensor 13 is used for generation of the deformation timing notification signal that decides whether to update the reference capacitance Cb(n, m), the configuration to detect the deformation operation and the configuration to generate the deformation timing notification signal can be made a common configuration, to simplify the configuration of the mobile terminal 10.

Next, a mobile terminal according to a second embodiment of the present invention will be described.

Figure 8:
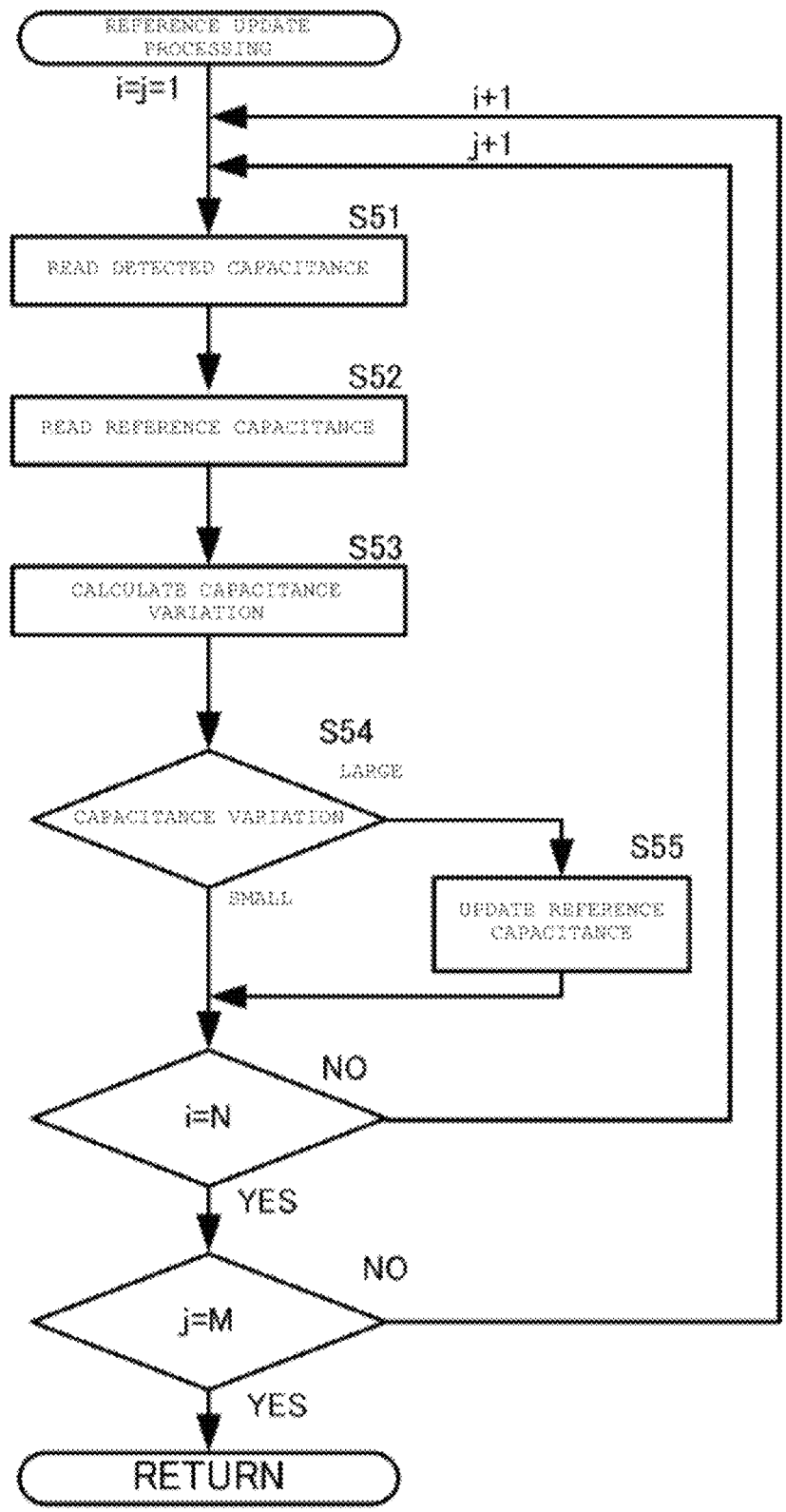
FIG. 8 is a flow diagram showing a control flow of reference update processing in a mobile terminal according to a second embodiment of the present invention.

FIG. 8 is a diagram showing a control flow in reference update processing in the mobile terminal according to the second embodiment. In the present embodiment, similarly to the first embodiment, the reference update processing is performed when the update control signal is inputted into the touch-operation detection unit, but only some of the reference capacitances are selected and updated.

Specifically, first, the touch-operation detection unit reads the detected capacitance Cs(n, m) from the memory at each position P(n, m) (S51), and also reads the non-updated reference capacitance Cb(n, m) from the memory (S52). Next, the touch-operation detection unit calculates a difference between the read detected capacitance Cs(n, m) and the reference capacitance Cb(n, m), namely a capacitance variation ΔC(n, m) (S53).

The touch-operation detection unit then determines the performance or non-performance of the touch operation based on a magnitude of the capacitance variation ΔC(n, m) (S54). For example, the touch-operation detection IC 16 compares the capacitance variation ΔC(n, m) with a threshold As.

Subsequently, when the capacitance variation ΔC(n, m) exceeds the threshold As, the touch-operation detection unit writes the most recently detected capacitances Cs(n, m), read from the memory, into the memory as the new reference capacitance Cb(n, m), and when the capacitance variation ΔC(n, m) does not exceed the threshold As, the touch-operation detection unit keeps the non-updated reference capacitance Cb(n, m) as it is (S55). By repeating the above processing, the touch-operation detection unit selects and updates part of the reference capacitances Cb(n, m).

The touch input device of the present invention may be configured as thus described, and by selecting and updating not all reference capacitances but some reference capacitance, it is possible to reduce calculation cost and processing time required for the reference update processing.

Figure 9:
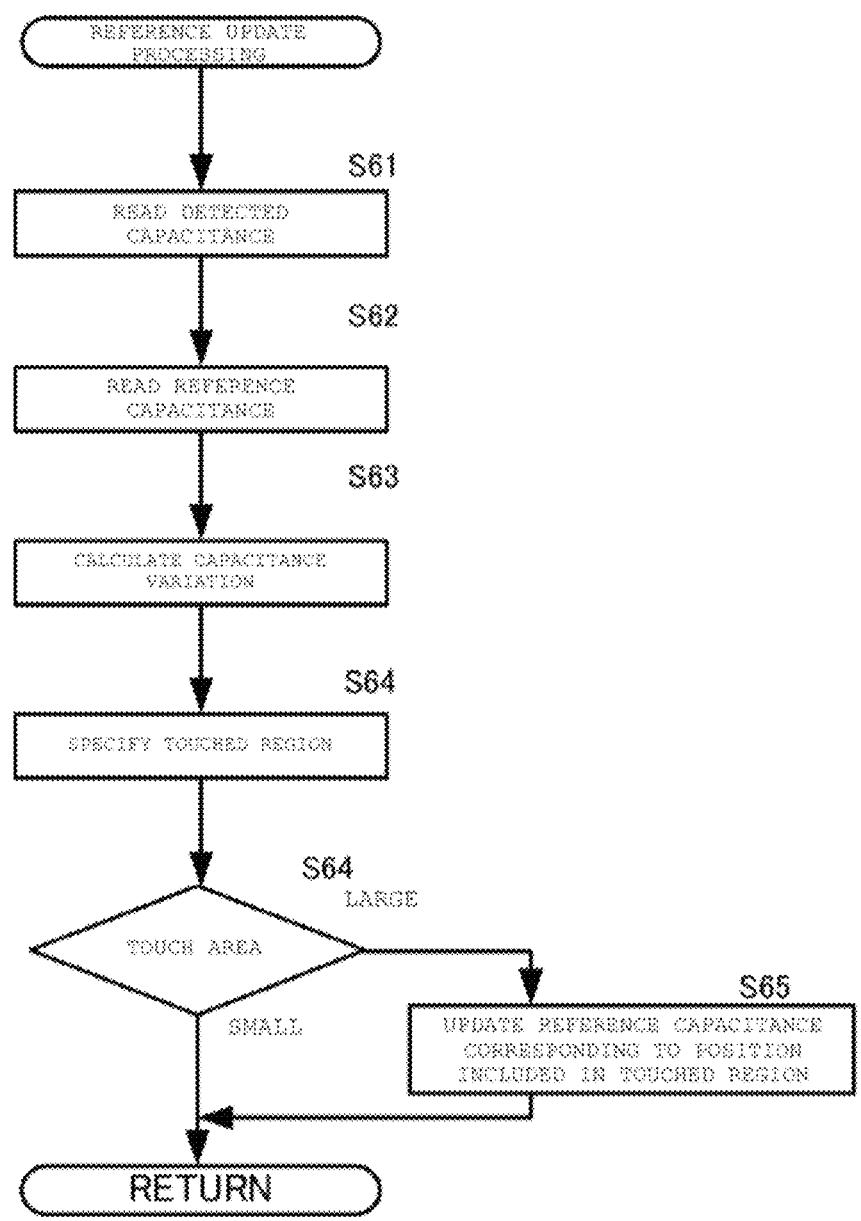
FIG. 9 is a flow diagram showing a control flow of reference update processing in a mobile terminal according to a third embodiment of the present invention.

Next, a mobile terminal according to a third embodiment of the present invention will be described. FIG. 9 is a diagram showing a control flow in reference update processing in the mobile terminal according to the third embodiment.

In the present embodiment, similarly to the second embodiment, only some reference capacitances are selected and updated in the reference update processing. However, differently from the first and second embodiment, only when an area of a touched region that is specified in the reference updating process exceeds a threshold area, a reference capacitance corresponding to a position included in the touched region is selected and updated.

To this end, the touch-operation detection unit reads both each detected capacitance Cs(n, m) and each non-updated reference capacitance Cb(n, m) from the memory (S62) (i.e., this processing is performed at each position P(n, m)). Next, the touch-operation detection unit calculates a difference between the read detected capacitance Cs(n, m) and the reference capacitance Cb(n, m), namely a capacitance variation ΔC(n, m) (S63). This processing is also performed at each position P(n, m).

Subsequently, by comparison between the capacitance variation ΔC(n, m) and the threshold As, or some other means, the touch-operation detection unit determines, for each position P(n, m), whether it is included in a region subjected to the touch operation (a touched region) or included in a region not subjected to the touch operation (an untouched region). Then, the touch-operation detection unit generates and stores, into the memory, mapping data that enables discrimination of the touched region and the untouched region (S64).

The touch-operation detection unit then calculates a value corresponding to an area (a touched area) S of the touched region and determines whether or not the value exceeds a threshold (a threshold area) Ss (S65). For example, by counting a total number of a plurality of adjacent positions determined as being in the touched region, a value corresponding to the area (the touched area) S of the touched region is calculated. When the touched area S exceeds the threshold area Ss, the touch-operation detection unit updates the reference capacitance Cb(n, m) corresponding to the position P(n, m) included in the touched region.

The touch input device according to the present invention may be configured as follows. In a state where deformation has occurred on the operation surface 3, since the touch operation is likely to be erroneously detected in a wide area, the reference capacitance is updated with respect to a touched region having a wide area as described above, whereby it is possible to reliably select a region in which deformation has occurred on the operation surface 3 and update the reference capacitance. This also enables reduction in calculation cost and calculation time required for the reference update processing.

Figure 10A:
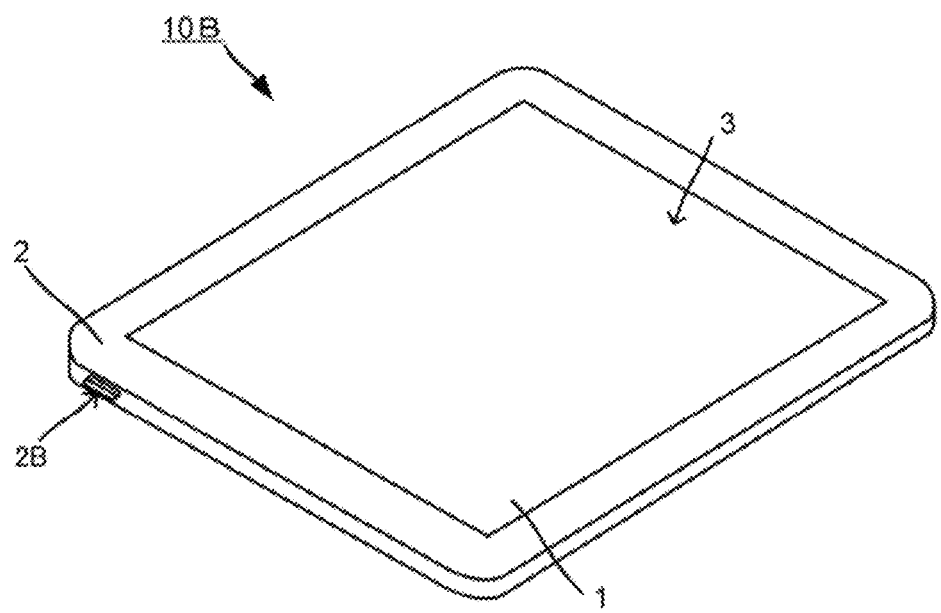
FIG. 10(A) is a perspective view of a mobile terminal according to a fourth embodiment of the present invention.

Next, a mobile terminal 10B according to a fourth embodiment of the present invention will be described. FIG. 10(A) is a perspective view of the mobile terminal 10B.

The mobile terminal 10B has a similar configuration to the configuration according to the first embodiment described above. However, it further includes a mechanical reset switch 2B on one side surface of the housing 2. If, due to a deformation of the operation surface, an invalid touch operation is determined, the user can rest the system by depressing the reset switch 2B. For example, the display may inform the user that an invalid touch operation has taken place and then the user can reset the system by depressing the reset switch 2B.

Figure 10B:
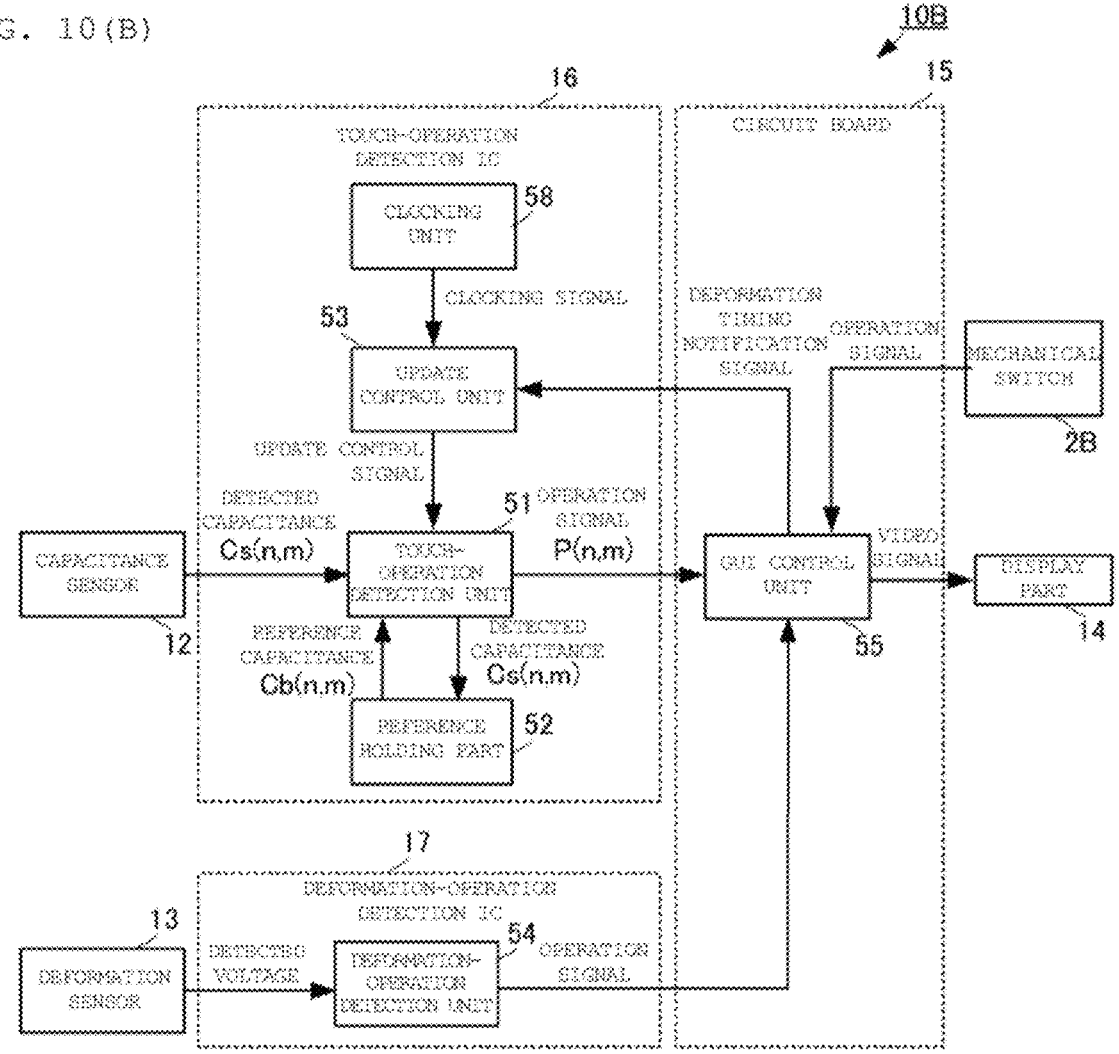
FIG. 10(B) is a function block diagram of the mobile terminal according to the fourth embodiment of the present invention.

FIG. 10(B) is a function block diagram of the mobile terminal 10B. This block diagram is substantially identical to the block diagram of FIG. 5, with the mechanical switch 2B added. When the switch 2B is depressed, it generates an operation signal which is applied to the GUI Control Unit 55. When the GUI Control Unit 55 receives this operation signal along with an operation signal from the deformation-operation detection unit 54, the GUI control unit 55 outputs a deformation timing notification signal to the update control unit 53 to cause the update control unit 53 to update the reference capacitances.

The touch input device of the present invention may be configured such that the update control unit 53 obtains the deformation timing notification signal based on a predetermined operation that is performed separately from the deformation operation as described above. Other than this, for example, it may be configured such that the update control unit 53 obtains the deformation timing notification signal when a predetermined touch operation is detected in a region where deformation of the operation surface has not occurred.

Finally, the description of each of the above embodiments should be considered as being illustrative in all respects and not being restrictive. The scope of the present invention is shown not by the foregoing embodiment but by the claims. Further, the scope of the present invention includes an equivalent scope to the scope of the claims.

DESCRIPTION OF REFERENCE SYMBOLS

1: touch panel
2: housing
2B: mechanical switch
3: operation surface
10, 10B: mobile terminal
11: operation plate
12: capacitance sensor
13: deformation sensor
14: display part
15: circuit board
16: touch-operation detection IC
17: deformation-operation detection IC
21: dielectric film 22, 23: detection electrode
31: piezoelectric film
32, 33: detection electrode
41: top surface polarizing plate
42: liquid crystal panel
43: rear surface polarizing plate
44: backlight
51: touch-operation detection unit
52: reference holding unit
53: update control unit
54: deformation-operation detection unit
55: GUI control unit
58: clocking unit

The invention claimed is:

1. A touch input device comprising:
   (a) an operation surface;
   (b) a deformation sensor;
   (c) a capacitance sensor comprising a plurality of capacitors, each respective capacitor corresponding to a respective location on the operation surface and having a capacitance that changes in response to a touch operation on the operation surface at its corresponding location;
   (d) a store for storing a respective stored reference value for each of the plurality of capacitors; and
   (e) a circuit that, for each respective capacitor of a set of two or more of the plurality of capacitors:
      (i) periodically reads a detected value of the capacitance of the respective capacitor;
      (ii) compares the detected value to the stored reference value for the respective capacitor; and
      (iii) updates the stored reference value for the respective capacitor with a most recently read detected value for the respective capacitor at the earlier of the lapse of a predetermined time period and the occurrence of a predetermined deformation of the operation surface as indicated by an output of the deformation sensor.

2. The touch input device according to claim 1, wherein the circuit determines, for at least a plurality of respective capacitors, that a touch operation has taken place at the location corresponding to the respective capacitor when the change in capacitance of the respective capacitor is greater than a predetermined value.

3. The touch input device according to claim 1, wherein the circuit determines a touch area as a function of which of the locations was subject to a touch operation.

4. The touch input device according to claim 3, wherein the stored reference values for each respective capacitor of the set of at least two of the capacitors are updated in response to the occurrence of the predetermined deformation of the operation surface only when the size of the touch area is greater than a predetermined value.

5. The touch input device according to claim 3, wherein the circuit determines a touch position to be the position within the touch area corresponding to the capacitor with the largest change in capacitance value.

6. The touch input device according to claim 3, wherein the circuit determines a touch position of a touch operation to be the position within the touch area corresponding to the center of the touch area.

7. The touch input device according to claim 1, wherein the capacitance sensor includes a dielectric part that is deformed integrally with the operation surface, and a plurality of detection electrodes, respective pairs of the detection electrodes defining respective ones of the plurality of capacitors.

8. The touch input device according to claim 1, wherein the circuit updates the stored reference value for the at least one of the capacitors in response to a user input other than either an occurrence of the touch operation or an occurrence of the predetermined operation surface.

9. The touch input device according to claim 1, wherein the set of two or more of the plurality of capacitors includes all of the capacitors.

10. The touch input device according to claim 1, wherein the deformation sensor is a piezoelectric sensor.

11. A method for determining whether a touch operation has been performed on an operation surface associated with both (a) a capacitance sensor comprising a plurality of capacitors, each respective capacitor corresponding to a respective location on the operation surface and having a capacitance that changes in response to a touch operation on the operation surface at its corresponding location, (b) a deformation sensor, and (c) a store for storing a respective stored reference value for each of the plurality of capacitors, the method comprising, for each respective capacitor of a set of two or more of the plurality of capacitors:
   (i) periodically reading a detected value of the capacitance of the respective capacitor;
   (ii) comparing the detected value to the stored reference value for the respective capacitor; and
   (iii) updating the stored reference value for the respective capacitor with a most recently read detected value for the respective capacitor at the earlier of the lapse of a predetermined time period and the occurrence of a predetermined deformation of the operation surface as indicated by an output of the deformation sensor.

12. The method according to claim 11 wherein, for at least a plurality of respective capacitors, a determination is made that the touch operation has taken place at the location corresponding to the respective capacitor when the change in capacitance of the respective capacitor is greater than a predetermined value.

13. The method according to claim 11, further comprising determining a touch area of the touch operation as a function of which of the locations was subject to the touch operation.

14. The method according to claim 13, wherein the stored reference values for each respective capacitor of the set of at least two of the capacitors are updated in response to the occurrence of the predetermined deformation of the operation surface only when the touch area is greater than a predetermined value.

15. The method according to claim 13, wherein a touch position of the touch operation is determined to be a position within the touch area corresponding to the capacitor with the largest change in capacitance value.

16. The method according to claim 13, wherein a touch position of the touch operation is determined to be a position within the touch area corresponding to the center of the touch area.

17. The method according to claim 11, wherein the set of two or more of the plurality of capacitors includes all of the capacitors.

18. The method according to claim 11, wherein the deformation sensor is a piezoelectric sensor.

* * * * *